United States Patent
Dick et al.

(10) Patent No.: US 7,065,065 B2
(45) Date of Patent: *Jun. 20, 2006

(54) ACCESS AND BACKOFF MECHANISM

(75) Inventors: Stephen G. Dick, Nesconset, NY (US);
Eldad Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/061,179

(22) Filed: Feb. 18, 2005

(65) Prior Publication Data
US 2005/0141436 A1 Jun. 30, 2005

Related U.S. Application Data

(63) Continuation of application No. 10/775,279, filed on Feb. 10, 2004, now Pat. No. 6,859,441, which is a continuation of application No. 09/593,879, filed on Jun. 14, 2000, now Pat. No. 6,721,281.

(51) Int. Cl.
*H04B 7/216* (2006.01)
*H04L 12/413* (2006.01)

(52) U.S. Cl. ................................. 370/335; 370/448

(58) Field of Classification Search ............. None
See application file for complete search history.

(56) References Cited

U.S. PATENT DOCUMENTS

| 5,752,193 | A | * | 5/1998 | Scholefield et al. ...... 455/452.2 |
| 5,892,759 | A | * | 4/1999 | Taketsugu .................... 370/349 |
| 5,936,962 | A | * | 8/1999 | Haddock et al. ............. 370/446 |
| 6,075,779 | A |   | 6/2000 | Agarwal et al. |
| 6,141,327 | A | * | 10/2000 | Kalkunte et al. ............ 370/252 |
| 6,317,585 | B1 | * | 11/2001 | Shibasaki ................... 455/13.2 |
| 6,366,779 | B1 |   | 4/2002 | Bendor et al. |
| 6,574,267 | B1 |   | 6/2003 | Kanterakis et al. |
| 6,614,772 | B1 |   | 9/2003 | Sexton et al. |
| 6,674,765 | B1 | * | 1/2004 | Chuah et al. ................ 370/458 |
| 6,704,328 | B1 | * | 3/2004 | Khaleghi et al. ............ 370/468 |
| 6,721,299 | B1 |   | 4/2004 | Song |

* cited by examiner

*Primary Examiner*—Duc Ho
(74) *Attorney, Agent, or Firm*—Volpe & Koenig, P.C.

(57) ABSTRACT

A base station transmits access control signals on a periodic basis having a first transmission rate. The base station transmits access control modification signals at a second transmission rate higher than the first transmission rate. The user equipment transmits an access attempt signal. The access attempt signal requests the base station to permit the user equipment access to the channel. The user equipment receives the transmitted access control signals and access modification signals. A wait period is determined based on in part the received access control signals and access control modification signals. In response to an unsuccessful access attempt, the user equipment delays transmitting a subsequent access attempt signal for the wait period.

21 Claims, 3 Drawing Sheets

ACCESS AND BACKOFF MECHANISM

CROSS REFERENCE TO RELATED APPLICATION(S)

This application is a continuation of U.S. patent application Ser. No. 10/775,279 filed Feb. 10, 2004, now U.S. Pat. No. 6,859,441; which is a continuation of U.S. patent application Ser. No. 09/593,879 filed Jun. 14, 2000, now U.S. Pat. No. 6,721,281; which claims priority to U.S. Provisional Patent Application No. 60/139,974 filed Jun. 18, 1999; all of which are incorporated by reference as if fully set forth.

BACKGROUND

The invention relates generally to resource allocation in a communication system. More specifically, the invention relates to controlling user equipment access attempts for communicating over a channel in a communication system.

FIG. 1 depicts a communication system 18. A base station 20 communicates with user equipments (UEs) $22_1$–$22_N$ in its operating area. In a system 18, data signals are communicated between UEs $22_1$–$22_N$ and the base station 20 over the same spectrum. Each data signal in the spectrum has a unique chip code sequence. Upon reception, using a replica of the chip code sequence, a particular data signal is recovered.

Since signals are distinguished by their chip code sequences (code), separate dedicated communication channels are created using different codes. Signals from the base station 20 to the UEs $22_1$–$22_N$ are sent on downlink channels and signals from the UEs $22_1$–$22_N$ to the base station 20 are sent on uplink channels.

In many communication systems, a channel is used and is capable of carrying packets of data from multiple UEs $22_1$–$22_N$. Each packet is distinguishable by a combination of time slot and code.

The transmission is time divided into repeating frames having time slots, such as fifteen time slots per frame. When a packet is transmitted over the channel, it may last for multiple frames.

A typical UE channel access attempt is as follows. Prior to communicating over the channel, a UE $22_1$ transmits a signal to the base station 20 to access the channel. One type of access signal uses a preamble code (preamble). The UE $22_1$ repeats the preamble while incrementally increasing transmission power levels. The UE $22_1$ repeats transmission of the preamble unit a response from the base station 20 is received or until a maximum number of repetitions is reached.

In response to receiving the preamble, the base station 20 determines whether the UE $22_1$ may utilize the channel. This utilization determination may be based on the availability of the channel, uplink interference levels or channel loading. If the access attempt is successful, the base station 20 transmits an acknowledgment signal (ACK) to the UE $22_1$. In response to the UE $22_1$ receiving the ACK, the UE sends an uplink packet over the channel. If the channel is not available, the base station 20 transmits a negative acknowledgment signal (NAK) to the UE $22_1$. Receiving a NAK or reaching the maximum number of repetitions are unsuccessful access attempts requiring the UE $22_1$ to reattempt access at a later time.

The period of time between access attempts is critical to a system's performance. If the period between access attempts is too long, the channel will be underutilized. If the period is too short, many UEs $22_1$–$22_N$ may repeatedly request access resulting in service interruptions.

One approach for controlling UE re-access attempts is to use a fixed backoff parameter. The UE $22_1$ will reattempt access for a period of time based on the backoff parameter. The backoff parameter represents a deterministic wait period for an access reattempt. A problem with a fixed backoff parameter is that it can not be adjusted in response to the cell loading. Accordingly, during periods of light loading, the channel may be underutilized and in periods of high loading service interruptions may result.

Another approach is a rule based approach. The UE $22_1$ analyzes its prior access attempt statistics. Based on the access statistics, the UE $22_1$, applying predetermined rules, determines a backoff parameter. To illustrate, if the UE $22_1$ had many unsuccessful access attempts, the period between accesses is increased. Since the UE's prior access attempts may not represent current conditions, this approach is not optimal.

Another approach is to broadcast a backoff parameter over a broadcast channel (BCH). The backoff parameter is based on the channel's loading, uplink interference level and other factors. The backoff parameter, Ubbch, is used to derive a backoff wait period at a time n, B(n), such as by equation 1.

$$B(n)=2^{Ubbch} \quad \text{Equation 1}$$

Due to delays in processing and transmitting the backoff parameter, the backoff parameter may not represent current conditions which is not optimal.

Accordingly, it is desirable to have other approaches for controlling UE access reattempts.

SUMMARY

A base station transmits control signals on a periodic basis having a first transmission rate. The base station transmits control modification signals at a second transmission rate higher than the first transmission rate. The user equipment transmits an attempt signal. The attempt signal requests the base station to permit the user equipment access to the channel. The user equipment receives the transmitted control signals and modification signals. A wait period is determined based on in part the received control signals and control modification signals. In response to an unsuccessful access attempt, the user equipment delays transmitting a subsequent access attempt signal for the wait period.

DETAILED DESCRIPTION OF THE PREFERRED EMBODIMENTS

Figure 1:
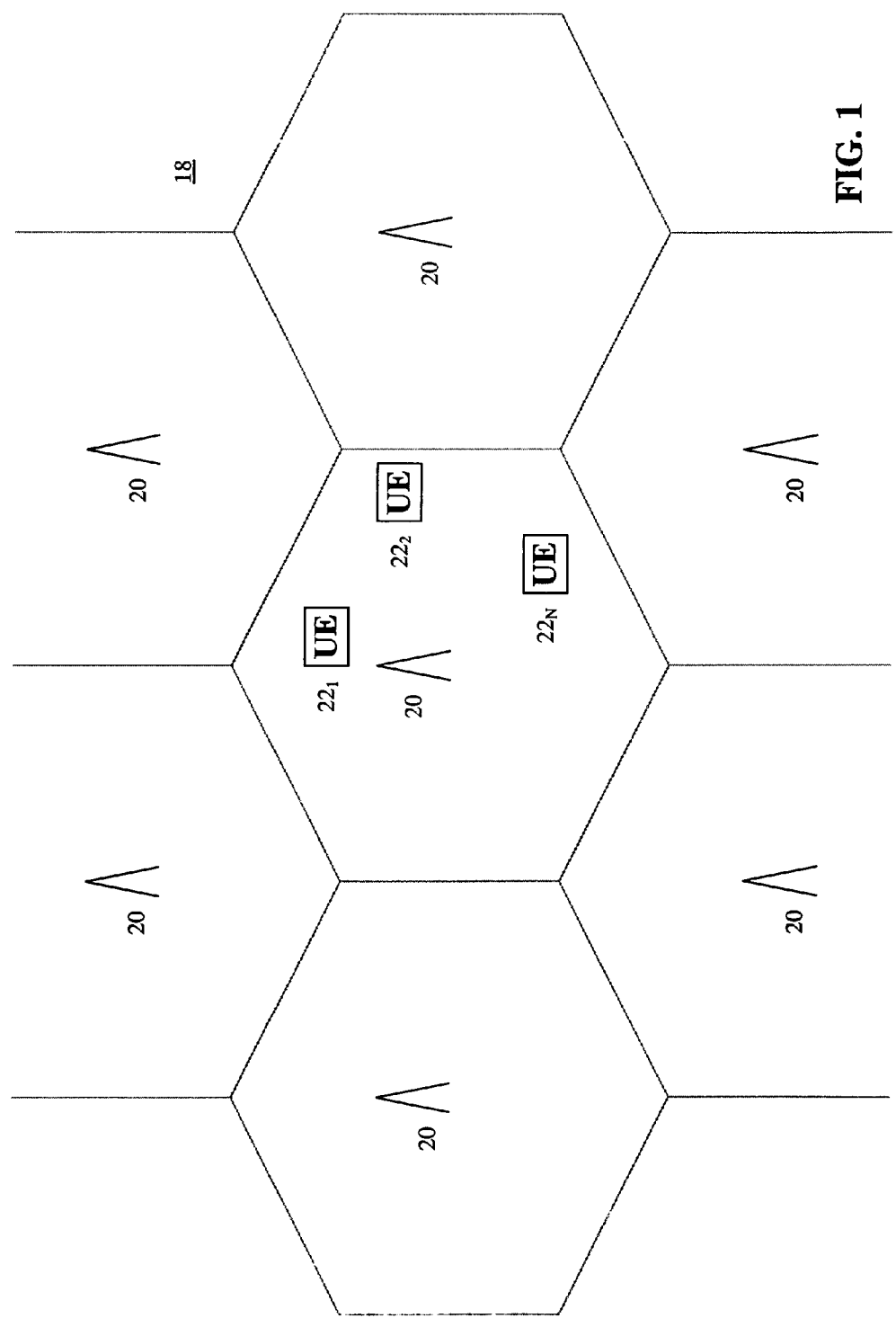
FIG. 1 is an illustration of a typical communication system.
Figure 2:
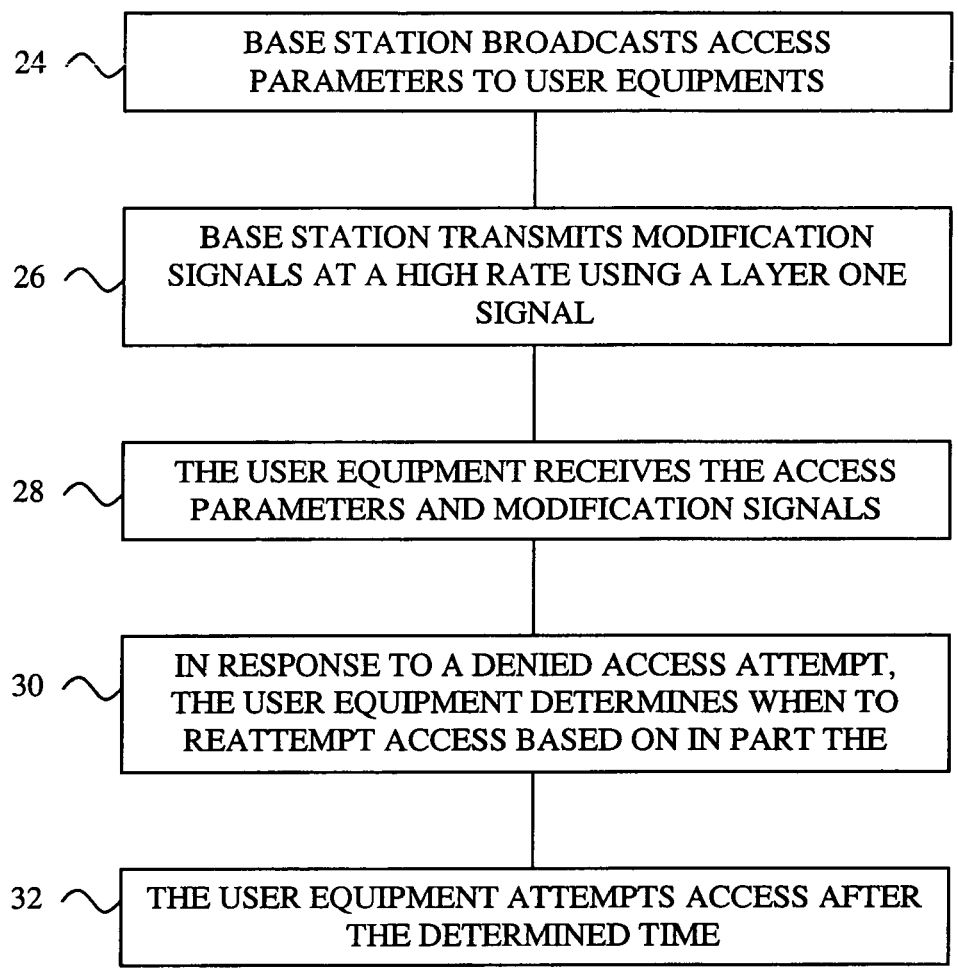
FIG. 2 is a flow chart of controlling user equipment reaccess attempts.

FIG. 2 is a flow chart for controlling UE reaccess attempts to communicate using the channel. The base station 20 broadcasts to all the UEs $22_1$–$22_N$ in its operating area access parameters, 24, such as the backoff parameter, Ubbch, or the persistence parameter, Upbch. The persistence parameter represents the probability that the UE $22_1$ should reattempt access within a specified time period.

Figure 3:
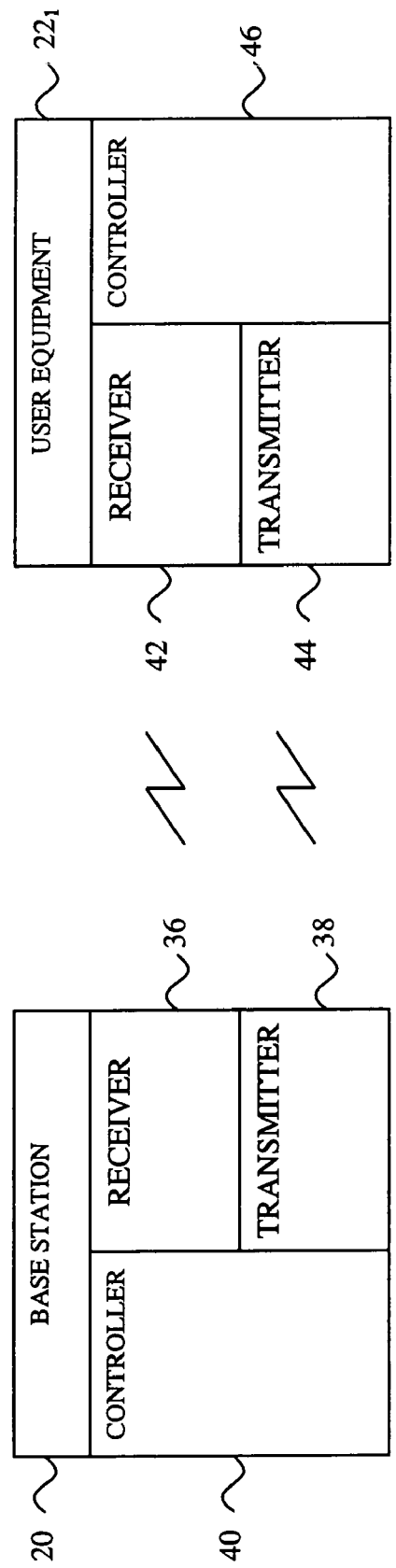
FIG. 3 is an illustration of a simplified user equipment and base station.

The access parameters are broadcast using the base station's transmitter 38 as shown in FIG. 3. FIG. 3 illustrates the simplified components of a base station 20 and a UE $22_1$. The base station 20 also transmits a modification signal, P mod, to the UEs $22_1$–$22_N$, such as by a layer one signal, 26. Layer one, also referred to as the physical layer, signaling dramatically increases the transmission speed and update rate of the modification signal.

The modification signal is used to update the access parameters. The modification signal may simple indicate a +1 to increase an access parameter or a −1 to decrease it. Such a modification signal may be sent over the acknowledgment indicator channel (AICH). One of the AICH's signatures is reserved for use for the modification signal. The phase of the transmitted modification signal represents the value of the modification signal. Alternately, other signals associated with communication systems may be used for the modification signal. If no modification signal is sent, no change is made to the access parameters. An alternate modification signal may indicate an amount of increase or decrease to an access parameter.

The value of the modification signal is determined by a controller 40 associated with the base station 20, such as a Controlling Radio Resource Controller (CRRC), and is typically based on the channel's loading, uplink interference level, other factors or a combination of those factors. One scheme adjusts the modification signal to maintain a constant average uplink interference level. The modification signal maybe sent on a periodic basis or only when the pertinent system conditions change.

The modification signal is transmitted by the base station's transmitter 38. The UE's receiver 44 receives the access parameters and the modification signals, 28. The UE's controller 46 determines the delay between access attempts using the received access parameters and modification signals, 30. The access attempts are subsequently transmitted by the UE's transmitter 42, 32.

One approach to adjusting the access period is to modify the backoff parameter, Ubbch. Equations 2 and 3 are used to determine the backoff wait period, B(n).

$$B(n)=2^{U(n)} \qquad \text{Equation 2}$$

$$U(n)=Ubbch+P\,\text{mod}\times dUb, \text{ where } Ub\,\text{min} \leq U(n) \leq Ub\,\text{max} \qquad \text{Equation 3}$$

The amount of backoff change, dUb, and the value of the limits, Ub min and Ub max, are either standardized or broadcast by the base station 20.

Another approach selectively modifies either the persistence or backoff parameter using the received modification signals. One technique for determining which parameter to modify is to distinguish the parameter modifications by a modification signal transmission time slot. To illustrate, if the AICH is used for sending the modification signal, time slot 1 indicates that the persistence parameter should be modified and time slot 4 indicates that the backoff parameter should be modified. The UE $22_1$ using its receiver would monitor the AICH for the modification signal and the controller 46 would determine the reception time slot. Additionally, the selected time slot may indicate a degree of change to the selected parameter. For instance, if the modification is sent in time slot 1, the persistence parameter is changed by dUp and if in time slot 2, the persistence parameter is changed by 2×dUp.

One such system uses Equations 4–7. If the modification signal is used to change the persistence parameter, Equations 4 and 5 are used.

$$P(n)=2^{Up(n)} \qquad \text{Equation 4}$$

$$Up(n) = \begin{cases} Up(n-1)+P\text{mod}\times dUp, & \text{when } Upbch \text{ is not recent} \\ Upbch, & \text{when } Upbch \text{ is recent} \end{cases} \qquad \text{Equation 5}$$

$$\text{where } Up\text{min} \leq Up(n) \leq Up\text{max}$$

P(n) is the probability that the UE $22_1$ should attempt access in the backoff wait period. The amount of persistence change, dUp, and the value of the limits, Up min and Up max, are either standardized or broadcast.

If the modification signal is used to change the backoff parameter, Equations 6 and 7 are used.

$$B(n)=2^{Ub(n)} \qquad \text{Equation 6}$$

$$Ub(n) = \begin{cases} Ub(n-1)+P\text{mod}\times dUp, & \text{when } Ubbch \text{ is not recent} \\ Ubbch, & \text{when } Ubbch \text{ is recent} \end{cases} \qquad \text{Equation 7}$$

$$\text{where } Ub\text{min} \leq Ub(n) \leq Ub\text{max}$$

Using the current persistence and backoff parameters, the next access attempt is determined. The backoff parameter establishes the wait period and the persistence parameter establishes the probability of an access attempt in that wait period.

What is claimed is:

1. A method for controlling user equipment access to a channel in a communication system, the method comprising:
   transmitting on a periodic basis having a first transmission rate from a base station access control signals;
   transmitting from the base station access control modification signals at a second transmission rate higher than the first transmission rate;
   transmitting from the user equipment an access attempt signal, the access attempt signal requesting the base station to permit the user equipment access to the channel;
   receiving at the user equipment the transmitted access control signals and access control modification signals;
   determining a wait period based on in part the received access control signals and access control modification signals; and
   in response to an unsuccessful access attempt to the channel, the user equipment delays transmitting a subsequent access attempt signal for the wait period.

2. The method of claim 1 wherein the access control modification signals are layer one signals.

3. The method of claim 1 further comprising:
   in response to receiving the transmitted access attempt signal, the base station determining whether the user equipment is permitted to access the channel;
   if a result of the determination is to permit access, transmitting from the base station an acknowledgment signal;
   if the result of the determination is to not permit access, transmitting from the base station a negative acknowledgment signal; and wherein an unsuccessful access attempt comprises receiving at the user equipment the negative acknowledgment signal.

4. The method of claim 3 wherein the step of the access attempt signal transmitting comprises repeatedly transmitting the access attempt signal from the user equipment for a maximum number of repetitions at increasing transmission power levels and an unsuccessful access attempt further comprises not receiving at the user equipment the acknowledgment or negative acknowledgment signal.

5. The method of claim 1 wherein the access control signals comprise backoff parameters and the wait period is a backoff wait period which is based on in part the received backoff parameters modified by the received modification signals.

6. The method of claim 1 wherein the wait period is based on in part a backoff wait period and a probability of sending an access signal during the backoff wait period.

7. The method of claim 6 wherein the access control signals comprise backoff parameters and persistence parameters and the backoff wait period is based on in part the received backoff parameters modified by the received modification signals.

8. The method of claim 6 wherein the access control signals comprise backoff parameters and persistence parameters and the sending access signal probability is based on in part the received persistence parameters modified by the received modification signals.

9. A communication system comprising:
a base station having:
means for transmitting on a period basis having a first transmission rate access control signals; and
means for transmitting access control modification signals at a second transmission rate higher than the first transmission rate; and
a user equipment having:
means for transmitting an access attempt signal, the access attempt signal requesting the base station to permit the user equipment access to a channel;
means for receiving the transmitted access control signals and access control modification signals;
means for determining a wait period based on in part the received access control signals and access control modification signals; and
means for delaying transmission of a subsequent access attempt signal for the wait period in response to an unsuccessful access attempt to the channel.

10. The system of claim 9 wherein the access control modification signals are layer one signals.

11. The system of claim 9 wherein:
the base station further comprises:
means for determining whether the user equipment is permitted to access the channel, in response to receiving the transmitted access attempt signal;
means for transmitting an acknowledgment signal, if a result of the determination is to permit access;
means for transmitting a negative acknowledgment signal, if a result of the determination is to not permit access; and
the user equipment further comprises:
means for receiving an acknowledgment and a negative acknowledgment signal; and
wherein an unsuccessful access attempt comprises receiving at the user equipment the negative acknowledgment signal.

12. The system of claim 9 wherein the access control signals comprise backoff parameters and the wait period is a backoff wait period which is based on in part the received backoff parameters modified by the received modification signals.

13. The system of claim 9 wherein the wait period is based on in part a backoff wait period and a probability of sending an access signal during the backoff wait period.

14. The system of claim 13 wherein the access control signals comprise backoff parameters and persistence parameters and the backoff wait period is based on in part the received backoff parameters modified by the received modification signals.

15. The system of claim 13 wherein the access control signals comprise backoff parameters and persistence parameters and the sending access signal probability is based on in part the received persistence parameters modified by the received modification signals.

16. A user equipment for use in a communication system, the user equipment comprising:
a transmitter for transmitting an access attempt signal and data packets over a channel, the access attempt signal requests a base station to permit the user equipment access to the channel;
a receiver for receiving access control signals and access control modification signals transmitted from the base station; and
a controller operatively coupled to the receiver and transmitter, the controller for determining a wait period based on in part the received access control signals and access control modification signals and for delaying transmission of a subsequent access attempt signal for the wait period in response to an unsuccessful access attempt to the channel.

17. The user equipment of claim 16 wherein the control modification signals are layer one signals.

18. The user equipment of claim 16 wherein the access control signals comprise backoff parameters and the wait period is a backoff wait period which is based on in part the received backoff parameters modified by the received modification signals.

19. The user equipment of claim 16 wherein the wait period is based on in part a backoff wait period and a probability of sending a signal during the backoff wait period.

20. The user equipment of claim 19 wherein the access control signals comprise backoff parameters and persistence parameters and the backoff wait period is based on in part the received backoff parameters modified by the received modification signals.

21. The user equipment of claim 19 wherein the access control signals comprise backoff parameters and persistence parameters and the sending access signal probability is based on in part the received persistence parameters modified by the received modification signals.

* * * * *

UNITED STATES PATENT AND TRADEMARK OFFICE
CERTIFICATE OF CORRECTION

PATENT NO. : 7,065,065 B2  Page 1 of 1
APPLICATION NO. : 11/061179
DATED : June 20, 2006
INVENTOR(S) : Dick et al.

It is certified that error appears in the above-identified patent and that said Letters Patent is hereby corrected as shown below:

ON THE FACE PAGE

At section (63), Related U.S. Application Data, page 1, left column, line 4, after "6,721,281", insert --, which claims benefit of 60/139,974 filed on Jun. 18, 1999--.

IN THE SPECIFICATION

At column 1, line 49, after the word "unit", insert --until--.

At column 3, line 11, after the word "may", delete "simple" and insert therefor --simply --.

Signed and Sealed this

Twenty-third Day of January, 2007

JON W. DUDAS
*Director of the United States Patent and Trademark Office*